US009531570B2

(12) United States Patent
Hekmat et al.

(10) Patent No.: US 9,531,570 B2
(45) Date of Patent: Dec. 27, 2016

(54) CML QUARTER-RATE PREDICTIVE FEEDBACK EQUALIZER ARCHITECTURE

(71) Applicant: SAMSUNG DISPLAY CO., LTD., Yongin, Gyeonggi-Do (KR)

(72) Inventors: Mohammad Hekmat, Mountain View, CA (US); Amir Amirkhany, Sunnyvale, CA (US)

(73) Assignee: Samsung Display Co., Ltd, Yongin (KR)

( * ) Notice: Subject to any disclaimer, the term of this patent is extended or adjusted under 35 U.S.C. 154(b) by 0 days.

(21) Appl. No.: 14/697,550

(22) Filed: Apr. 27, 2015

(65) Prior Publication Data

US 2015/0349984 A1    Dec. 3, 2015

Related U.S. Application Data

(60) Provisional application No. 62/003,476, filed on May 27, 2014.

(51) Int. Cl.
*H03H 7/30* (2006.01)
*H03H 7/40* (2006.01)
(Continued)

(52) U.S. Cl.
CPC ............ *H04L 25/03057* (2013.01); *H04L 2025/03503* (2013.01)

(58) Field of Classification Search
CPC ............ H04L 25/03057; H04L 2025/0349; H04L 25/067; H03K 3/356113; H03K 5/082

See application file for complete search history.

(56) References Cited

U.S. PATENT DOCUMENTS 7,715,474 B2 *   5/2010  Park et al. ............... 375/233
8,126,045 B2     2/2012  Bulzacchelli et al.
(Continued)

FOREIGN PATENT DOCUMENTS

KR    10-2010-0027191 A    3/2010

OTHER PUBLICATIONS

Hyung-Joon Chi; Jae-seung Lee; Seong-Hwan Jeon; Seung-Jun Bae; Young-Soo Sohn; Jae-Yoon Sim; Hong-June Park, "A Single-Loop SS-LMS Algorithm With Single-Ended Integrating DFE Receiver for Multi-Drop DRAM Interface," Solid-State Circuits, IEEE Journal of , vol. 46, No. 9, pp. 2053,2063, Sep. 2011.*

(Continued)

*Primary Examiner* — Hirdepal Singh
*Assistant Examiner* — Amneet Singh
(74) *Attorney, Agent, or Firm* — Lewis Roca Rothgerber Christie LLP

(57) ABSTRACT

A system for reduced-rate predictive DFE. In one embodiment a plurality of sampler-multiplexer blocks, each including two samplers and a multiplexer-latch, controlled by a multi-phase clock, sample the received analog signal one at a time, and the output of each multiplexer-latch, which may represent the value of the last received bit, is used to control the select input of another multiplexer-latch, so that the other multiplexer-latch selects the appropriate one of two samplers, each applying a different correction to the received analog signal before sampling. Each multiplexer-latch is a clocked element that tracks the data input when the signal at its clock input has a first logic level and retains its output state when its clock input has another (i.e., a second) logic level.

13 Claims, 12 Drawing Sheets

(51) Int. Cl.
*H03K 5/159* (2006.01)
*H04L 25/03* (2006.01)

(56) References Cited

U.S. PATENT DOCUMENTS

| | | | |
|---|---|---|---|
| 2005/0002475 A1* | 1/2005 | Menolfi | H04L 7/0334 375/340 |
| 2005/0201491 A1* | 9/2005 | Wei | H04L 7/0337 375/326 |
| 2006/0188043 A1* | 8/2006 | Zerbe et al. | 375/346 |
| 2008/0310495 A1* | 12/2008 | Bulzacchelli et al. | 375/233 |
| 2009/0010320 A1* | 1/2009 | Hollis | 375/232 |
| 2009/0252215 A1* | 10/2009 | Bulzacchelli et al. | 375/233 |
| 2010/0202506 A1* | 8/2010 | Bulzacchelli et al. | 375/233 |
| 2010/0238993 A1 | 9/2010 | Huang et al. | |
| 2011/0249774 A1* | 10/2011 | Thakkar et al. | 375/316 |
| 2013/0028313 A1* | 1/2013 | Shen et al. | 375/233 |
| 2013/0127507 A1* | 5/2013 | Zhuang | H03K 3/35625 327/203 |
| 2013/0278296 A1* | 10/2013 | Amirkhany et al. | 327/108 |
| 2013/0300481 A1* | 11/2013 | Bulzacchelli et al. | 327/175 |
| 2013/0335129 A1* | 12/2013 | Kao | H03K 3/356043 327/202 |
| 2014/0226707 A1 | 8/2014 | Kaviani et al. | |
| 2015/0070364 A1* | 3/2015 | Anantharaman et al. | 345/505 |

OTHER PUBLICATIONS

Kaviani, et al.; A Tri-Modal 20-Gbps/Link Differential/DDR3/GDDR5 Memory Interface; IEEE Journal of Solid-State Circuits, vol. 47, No. 4, Apr. 2012; pp. 926-937.

Emami-Neyestanak et al.; A 6.0-mW 10.0-Gb/s Receiver With Switched-Capacitor Summation DFE; IEEE Journal of Solid State Circuits, vol. 42, No. 4, Apr. 2007; pp. 889-896.

\* cited by examiner

US 9,531,570 B2

CML QUARTER-RATE PREDICTIVE FEEDBACK EQUALIZER ARCHITECTURE

CROSS-REFERENCE TO RELATED APPLICATION(S)

The present application claims priority to and the benefit of U.S. Provisional Application No. 62/003,476, filed May 27, 2014, entitled "CML QUARTER-RATE PREDICTIVE DECISION FEEDBACK EQUALIZER ARCHITECTURE", the entire content of which is incorporated herein by reference.

FIELD

The following description relates to transmission of digital data over a non-ideal (e.g., lossy) channel, and more particularly to a predictive decision feedback equalizer for mitigating inter-symbol interference resulting from transmission through a non-ideal channel.

BACKGROUND

High-speed digital data links may suffer from inter-symbol interference, especially in situations in which loss, reflections or other imperfections exist in the transmission channel. Inter-symbol interference may have the effect that the signal received during a given clock cycle is a linear combination of the bit transmitted during the corresponding clock cycle at the transmitter, and of the bits transmitted during a number of preceding clock cycles. The effects of inter-symbol interference may be mitigated using a technique referred to as decision feedback equalization (DFE) which involves correcting the received signal at the sampling point, during each clock cycle, with a linear combination of the bits received during a number of preceding clock cycles.

The contribution from the immediately preceding received bit, which is referred to as the first tap, may be generated using a technique referred to as predictive decision feedback equalization (predictive DFE, which may also be referred to as speculative DFE or loop-unrolled DFE), in which two correction terms are calculated, one corresponding to a received 1, and one corresponding to a received 0 in the immediately preceding received bit; the appropriate one of these two correction terms is then selected using a multiplexer (MUX) once a binary value for the bit received on the immediately preceding clock cycle is available. The processing of the correction from the last received bit may impose relatively stringent requirements on the operating speed of the circuit.

Thus, there is a need for a system for predictive DFE with relaxed timing requirements for circuits in the DFE loop.

SUMMARY

Aspects of embodiments of the present disclosure are directed toward a system for predictive DFE with relaxed requirements on individual blocks. In one embodiment a plurality of sampler-multiplexer blocks, each including two samplers and a multiplexer-latch, controlled by a multi-phase clock, sample the received analog signal one at a time, and the output of each multiplexer-latch, which may represent the value of the last received bit, is used to control the select input of another multiplexer-latch, so that the other multiplexer-latch selects the appropriate one of two samplers, each applying a different correction to the received analog signal before sampling. Each multiplexer-latch is a clocked element that tracks the selected data input when the signal at its clock input has a first logic level and retains its output state when its clock input has another (i.e., a second) logic level. In other words, after the clock transitions from the first logic level to the second logic level, the multiplexer holds the output value it had at the time of the transition.

According to an embodiment of the present invention there is provided a system for predictive decision feedback equalization, the system including: a first sampler-multiplexer block and a second sampler-multiplexer block, each of the first sampler-multiplexer block and the second sampler-multiplexer block including: a first sampler and a second sampler, the first sampler and the second sampler having a common analog input and a common clock input, each of the first sampler and the second sampler being to retain its output state when a clock signal at its clock input is a first logic level; and a multiplexer-latch connected, e.g., directly connected, to an output of the first sampler and to an output of the second sampler, the multiplexer-latch having a clock input, a select input, and an output, the multiplexer-latch being to retain its output state when a clock signal at its clock input is a second logic level, the output of the multiplexer-latch of the first sampler-multiplexer block being connected, e.g., directly connected, to the select input of the multiplexer-latch of the second sampler-multiplexer block; and a clock generator having: a first clock output having a first phase and a duty cycle substantially equal to 50%, and a second clock output having a second phase delayed by one unit interval with respect to the first phase and a duty cycle substantially equal to 50%, the first clock output of the clock generator being connected, e.g., directly connected, to the common clock input of the first and second samplers of the first sampler-multiplexer block, and the second clock output of the clock generator being connected, e.g., directly connected, to the clock input of the multiplexer-latch of the first sampler-multiplexer block and to the common clock input of the first and second samplers of the second sampler-multiplexer block.

In one embodiment, the system includes four sampler-multiplexer blocks including the first sampler-multiplexer block, the second sampler-multiplexer block, a third sampler-multiplexer block, and a fourth sampler-multiplexer block, each of the third sampler-multiplexer block and the fourth sampler-multiplexer block including: a first sampler and a second sampler, the first sampler and the second sampler having a common analog input and a common clock input, each of the first sampler and the second sampler being to retain its output state when a third clock signal at its clock input is the first logic level; and a multiplexer-latch connected, e.g., directly connected, to an output of the first sampler and to an output of the second sampler, the multiplexer-latch having a clock input, a select input, and an output, the multiplexer-latch being to retain its output state when a fourth clock signal at its clock input is the second logic level, wherein: the output of the multiplexer-latch of the second sampler-multiplexer block is connected, e.g., directly connected, to the select input of the multiplexer-latch of the third sampler-multiplexer block, the output of the multiplexer-latch of the third sampler-multiplexer block is connected, e.g., directly connected, to the select input of the multiplexer-latch of the fourth sampler-multiplexer block, and the output of the multiplexer-latch of the fourth sampler-multiplexer block is connected, e.g., directly connected, to the select input of the multiplexer-latch of the first sampler-multiplexer block.

In one embodiment, the clock generator further has: a third clock output having a third phase delayed by one unit interval with respect to the second phase and a duty cycle substantially equal to 50%, a fourth clock output having a fourth phase delayed by one unit interval with respect to the third phase and a duty cycle substantially equal to 50%, the first phase is delayed by one unit interval with respect to the fourth phase, the first clock output of the clock generator is connected, e.g., directly connected, to the clock input of the multiplexer-latch of the fourth sampler-multiplexer block, the third clock output of the clock generator is connected, e.g., directly connected, to the clock input of the multiplexer-latch of the second sampler-multiplexer block and to the common clock input of the first and second samplers of the third sampler-multiplexer block, and the fourth clock output of the clock generator is connected, e.g., directly connected, to the clock input of the multiplexer-latch of the third sampler-multiplexer block and to the common clock input of the first and second samplers of the fourth sampler-multiplexer block.

In one embodiment, the first logic level is logical low and the second logic level is logical low.

In one embodiment, the system includes a first transistor and a second transistor, and a second differential pair having a differential output and including a third transistor and a fourth transistor, the differential output of the first differential pair being connected, e.g., directly connected, to the differential output of the second differential pair.

In one embodiment, the system includes a first transistor and a second transistor; and a cross-coupled pair including a third transistor and a fourth transistor.

According to an embodiment of the present invention there is provided a system for predictive decision feedback equalization, the system including: a first sampler-multiplexer block and a second sampler-multiplexer block, each of the first sampler-multiplexer block and the second sampler-multiplexer block including: a first sampler and a second sampler, the first sampler and the second sampler having a common analog input and a common clock input, each of the first sampler and the second sampler being to retain its output state when a first clock signal at its clock input is a first logic level; and a multiplexer-latch connected, e.g., directly connected, to an output of the first sampler and to an output of the second sampler, the multiplexer-latch having a clock input, a select input, and an output, the multiplexer-latch being to retain its output state when a second clock signal at its clock input is a second logic level, the output of the multiplexer-latch of the first sampler-multiplexer block being connected, e.g., directly connected, to the select input of the multiplexer-latch of the second sampler-multiplexer block In one embodiment, the system includes a clock generator having: a first clock output having a first phase, and a second clock output having a second phase delayed by one unit interval with respect to the first phase, the first clock output of the clock generator being connected, e.g., directly connected, to the common clock input of the first and second samplers of the first sampler-multiplexer block.

In one embodiment, the first clock output has a duty cycle substantially equal to 50%, and the second clock output has a duty cycle substantially equal to 50%.

In one embodiment, the second clock output of the clock generator is connected, e.g., directly connected, to the clock input of the multiplexer-latch of the first sampler-multiplexer block and to the common clock input of the first and second samplers of the second sampler-multiplexer block.

In one embodiment, the first clock output has a duty cycle substantially equal to 50%, and the second clock output has a duty cycle substantially equal to 50%.

In one embodiment, the system includes four sampler-multiplexer blocks including the first sampler-multiplexer block, the second sampler-multiplexer block, a third sampler-multiplexer block, and a fourth sampler-multiplexer block, each of the third sampler-multiplexer block and the fourth sampler-multiplexer block including: a first sampler and a second sampler, the first sampler and the second sampler having a common analog input and a common clock input, each of the first sampler and the second sampler being to retain its output state when a third clock signal at its clock input is the first logic level; and a multiplexer-latch connected, e.g., directly connected, to an output of the first sampler and to an output of the second sampler, the multiplexer-latch having a clock input, a select input, and an output, the multiplexer-latch being to retain its output state when a fourth clock signal at its clock input is the second logic level, wherein: the output of the multiplexer-latch of the second sampler-multiplexer block is connected, e.g., directly connected, to the select input of the multiplexer-latch of the third sampler-multiplexer block, the output of the multiplexer-latch of the third sampler-multiplexer block is connected, e.g., directly connected, to the select input of the multiplexer-latch of the fourth sampler-multiplexer block, and the output of the multiplexer-latch of the fourth sampler-multiplexer block is connected, e.g., directly connected, to the select input of the multiplexer-latch of the first sampler-multiplexer block.

In one embodiment, the system includes a clock generator having: a first clock output having a first phase, and a second clock output having a second phase delayed by one unit interval with respect to the first phase, a third clock output having a third phase delayed by one unit interval with respect to the second phase, a fourth clock output having a fourth phase delayed by one unit interval with respect to the third phase, wherein: the first phase is delayed by one unit interval with respect to the fourth phase, the first clock output of the clock generator is connected, e.g., directly connected, to the clock input of the multiplexer-latch of the fourth sampler-multiplexer block and to the common clock input of the first and second samplers of the first sampler-multiplexer block, the second clock output of the clock generator is connected, e.g., directly connected, to the clock input of the multiplexer-latch of the first sampler-multiplexer block and to the common clock input of the first and second samplers of the second sampler-multiplexer block, the third clock output of the clock generator is connected, e.g., directly connected, to the clock input of the multiplexer-latch of the second sampler-multiplexer block and to the common clock input of the first and second samplers of the third sampler-multiplexer block, the fourth clock output of the clock generator is connected, e.g., directly connected, to the clock input of the multiplexer-latch of the third sampler-multiplexer block and to the common clock input of the first and second samplers of the fourth sampler-multiplexer block.

In one embodiment, the first clock output has a duty cycle substantially equal to 50%, the second clock output has a duty cycle substantially equal to 50%, the third clock output has a duty cycle substantially equal to 50%, and the fourth clock output has a duty cycle substantially equal to 50%.

In one embodiment, the first logic level is the same logic level as the second logic level.

In one embodiment, the first logic level is logical low and the second logic level is logical low.

In one embodiment, the system includes a first transistor and a second transistor, and a second differential pair having a differential output and including a third transistor and a fourth transistor, the differential output of the first differential pair being connected, e.g., directly connected, to the differential output of the second differential pair.

In one embodiment, the system includes an adder connected, e.g., directly connected, to the first sampler-multiplexer block.

In one embodiment, the system includes: a timing controller including a digital output; and a driver integrated circuit (IC) including: an IC input; and an input, of the system of claim 7, connected, e.g., directly connected, to the IC input, the digital output of the timing controller being connected, e.g., directly connected, to the IC input of the driver IC.

According to an embodiment of the present invention there is provided a system for predictive decision feedback equalization, the system including: a first sampler-multiplexer block including: a first sampler and a second sampler, the first sampler and the second sampler having a common analog input and a common clock input, each of the first sampler and the second sampler being to retain its output state when a first clock signal at its clock input is a first logic level; and a multiplexer-latch connected, e.g., directly connected, to an output of the first sampler and to an output of the second sampler, the multiplexer-latch having a clock input, a select input, and an output, the multiplexer-latch being to retain its output state when a second clock signal at its clock input is a second logic level, a second sampler-multiplexer block including: a third sampler and a fourth sampler, the third sampler and the fourth sampler having a common analog input and a common clock input, each of the third sampler and the fourth sampler being to retain its output state when a third clock signal at its clock input is a first logic level; and a multiplexer-latch connected, e.g., directly connected, to an output of the third sampler and to an output of the fourth sampler, the multiplexer-latch having a clock input, a select input, and an output, the multiplexer-latch being to retain its output state when a fourth clock signal at its clock input is a second logic level, the output of the multiplexer-latch of the first sampler-multiplexer block being connected, e.g., directly connected, to the select input of the multiplexer-latch of the second sampler-multiplexer block; and a clock generator having: a first clock output having a first phase and a duty cycle substantially equal to 50%, and a second clock output having a second phase delayed by one unit interval with respect to the first phase and a duty cycle substantially equal to 50%, the first clock output of the clock generator being connected, e.g., directly connected, to the common clock input of the first and second samplers of the first sampler-multiplexer block, and the second clock output of the clock generator being connected, e.g., directly connected, to the clock input of the multiplexer-latch of the first sampler-multiplexer block and to the common clock input of the third and fourth samplers of the second sampler-multiplexer block.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a current-mode logic (CML) quarter-rate predictive feedback equalizer architecture provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
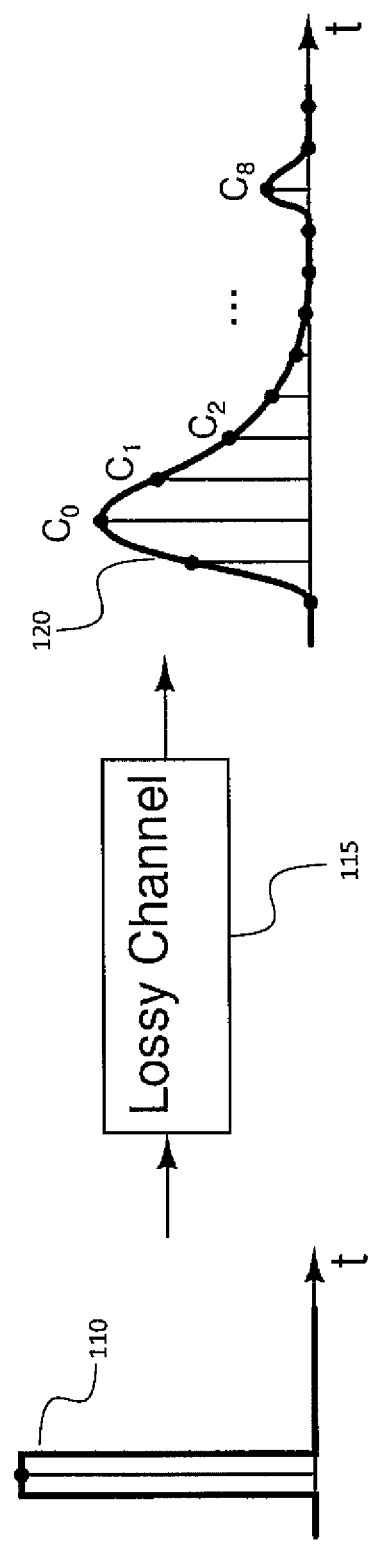
FIG. 1A is an illustration of an input signal to a non-ideal (e.g., lossy) channel and an output signal from the non-ideal channel, exhibiting the effects of inter-symbol interference.

Referring to FIG. 1A, in one embodiment a signal transmitted by a transmitter is a single square pulse 110, which, after being transmitted through a non-ideal (e.g., lossy) channel 115 becomes a received analog signal 120, having a different shape from the transmitted signal. The received signal 120 has a value $C_0$ when the analog signal is sampled in the receiver, and, because of the imperfect characteristics of the non-ideal channel, the effect of the transmitted pulse 110 persists for several unit intervals, taking residual signal values referred to as residues $C_1$, $C_2$, and so on. In a high-speed serial link, a series of pulses may be transmitted at a rate referred to as the aggregate data rate, each pulse representing a logical high or logical low (i.e., a binary 1 or a binary 0). The residual signal from pulses received earlier may causes inter-symbol interference when a current pulse is received, because the residual signal is received at the same time as, and superimposed on, the current pulse.

Figure 1B:
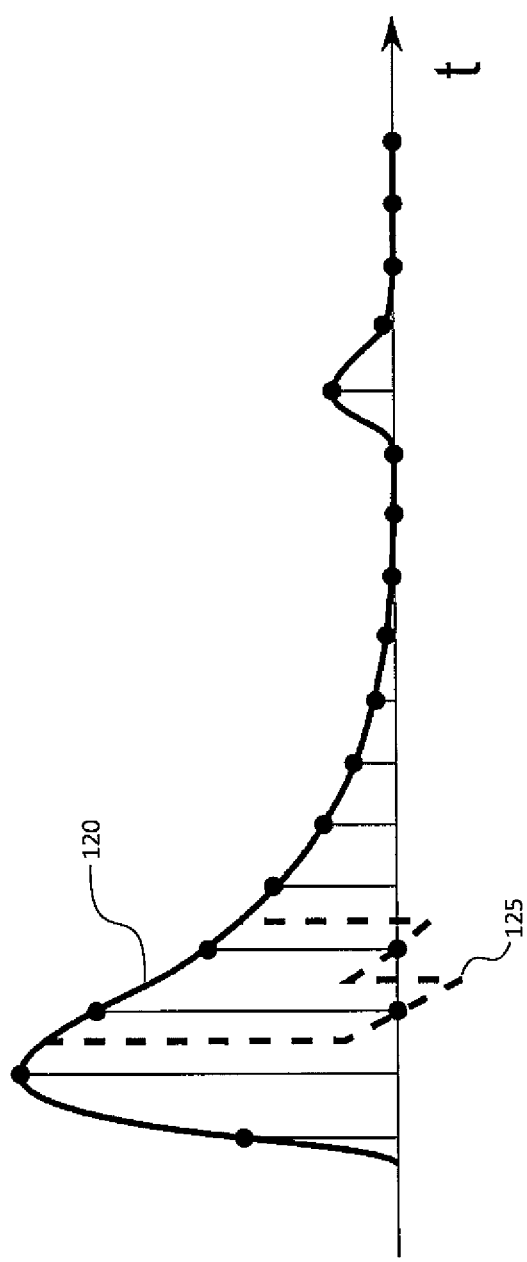
FIG. 1B is a graph showing a signal exhibiting the effects of inter-symbol interference, and a signal in which the effects of inter-symbol interference have been mitigated by feedback equalization according to an embodiment of the present invention.

Referring to FIG. 1B, decision feedback equalization may be used after a decision is made in the receiver regarding whether the transmitted pulse was a 0 or a 1. Once this decision has been made, the shape of the received analog signal corresponding to the transmitted pulse is inferred, the residues at various sampling time delays are calculated, and the calculated residues are subtracted from the subsequently received signal 120, to reduce the effects of inter-symbol interference in a corrected signal 125.

Figure 2:
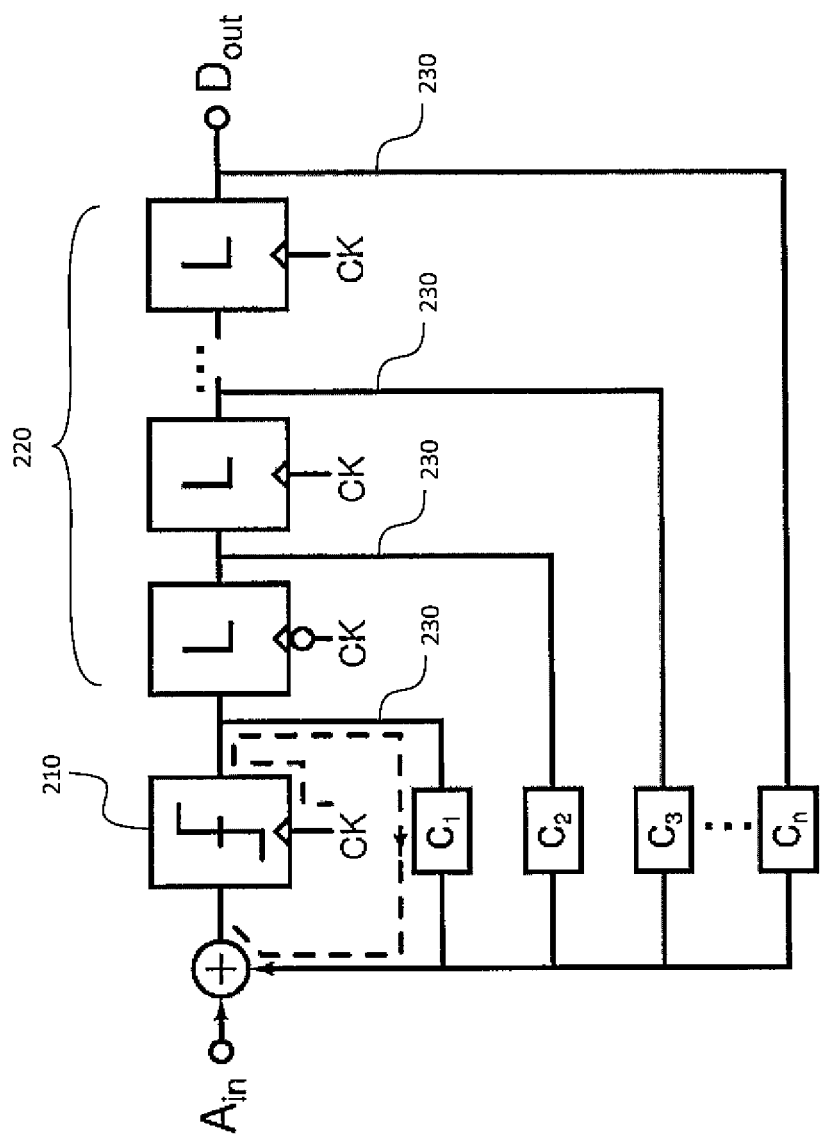
FIG. 2 is a schematic diagram of a system for direct decision feedback equalization.

Referring to FIG. 2, in a related art embodiment, direct DFE is accomplished by processing the received signal with a clocked comparator or "sampler" 210 followed by a shift register 220. The sampler has an analog input, and on a rising or falling clock edge, the output of the sampler is set to logical high or logical low according to whether the analog signal, at the time of the clock edge, is above or below a threshold.

Each successive previous bit output 230, including the output of the sampler and the previous bit outputs of the shift register, contains the bit received at a previous sampling time. Each previous bit output 230 is multiplied by a constant corresponding to the residue (forming a product referred to as a "tap"), and fed back and added to the received signal, to cancel the residues from the bits received earlier. The path from the first previous bit output (i.e., from the output of the sampler) is referred to as the critical path because timing along this path presents the greatest challenge in the operation of a direct DFE circuit: in this path the previous bit is resolved and multiplied by the corresponding constant ($C_1$) and subtracted from the current input in one unit interval (UI). As used herein, a unit interval is an interval of time equal to 1 divided by the aggregate data rate. For an aggregate data rate of 6 Gbps, for example, a unit interval is 1/(6e9) seconds.

Figure 3:
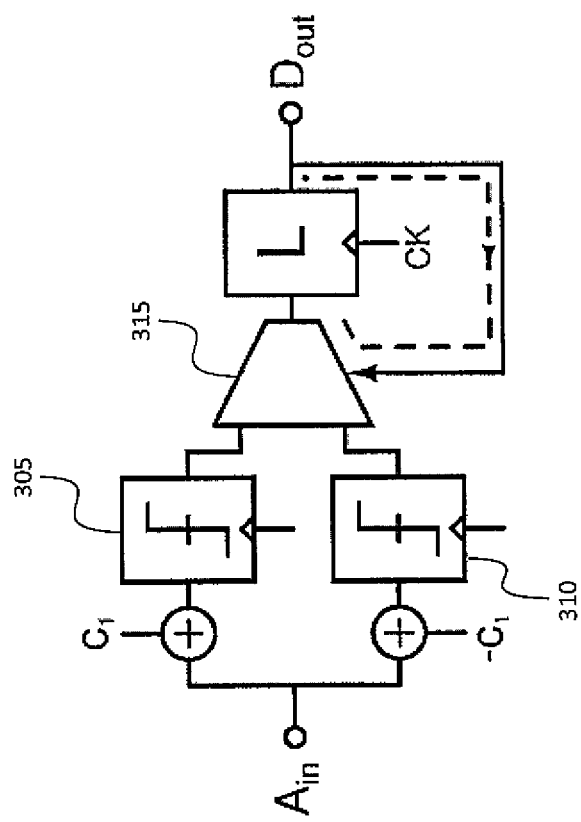
FIG. 3 is a schematic diagram of a system for predictive decision feedback equalization.

Referring to FIG. 3, in a predictive DFE according to one related art embodiment used to obtain improvements in speed over direct DFE, the two possible outcomes, corresponding respectively to a zero or a one having been received, are pre-calculated by adding an offset $C_1$ to, or subtracting the offset $C_1$ from, the input signal in two respective branches of the circuit, and converting each result to a digital value in each of two samplers 305, 310. Equivalently, the thresholds of the samplers in the two branches may be adjusted respectively down or up by the offset $C_1$. The correct outcome is selected, in a multiplexer 315, when a decision is made in the receiver regarding whether the most recently received bit (which may be referred to simply as the "last received bit") was a zero or a one. A predictive DFE may have one or more predictive taps.

Figure 4:
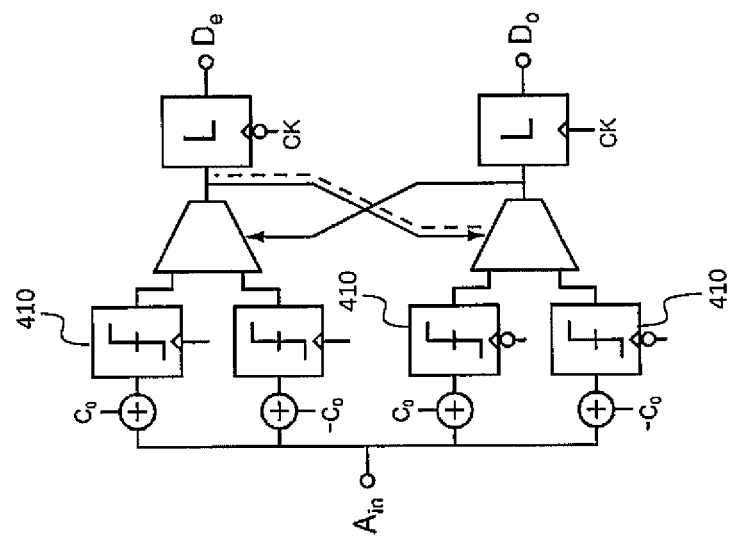
FIG. 4 is a schematic diagram of a half-rate system for predictive decision feedback equalization.

Referring to FIG. 4, in one embodiment, two parallel paths, each running at one-half of the input data rate, and each performing predictive DFE, may be employed. Half-rate operation may make higher input data rates possible, or it may make it possible to relax the timing requirements on the elements in the two parallel paths. In the embodiments of FIG. 4, the output of each of the flip-flop samplers 410 changes only on a clock edge. In other embodiments, more than two parallel data paths, e.g., four or eight parallel data paths may be used, operating at lower data rates (e.g., operating at one quarter or one eighth of the input data rate).

A sampler that is not a flip-flop sampler, e.g., a current-mode logic (CML) latch-based sampler, may have lower propagation delay than a flip-flop sampler. A CML latch-based sampler may have a data input and a clock input, and an output that tracks the data input when the signal at the clock input has a first logic level (e.g., logical high or logical low) and that retains the output value or output state when the clock input has a second logic level (i.e., the other logic level; e.g., logical low when the first logic level is logical high, or logical high when the first logic level is logical low). The circuit of FIG. 4, however, may not operate reliably if latch-based samplers are used instead of flip-flop samplers. For example during the part of the clock cycle when the clock is high, the output of the multiplexer in the lower branch should, for proper operation, be held at the previous bit received, and should not change. If latch-based samplers are used, however, then when the clock is high, the outputs of the latch-based samplers in the upper data path may change, causing the output of the multiplexer in the upper data path to change, which may in turn cause the output of the multiplexer in the lower data path to change.

Figure 5A:
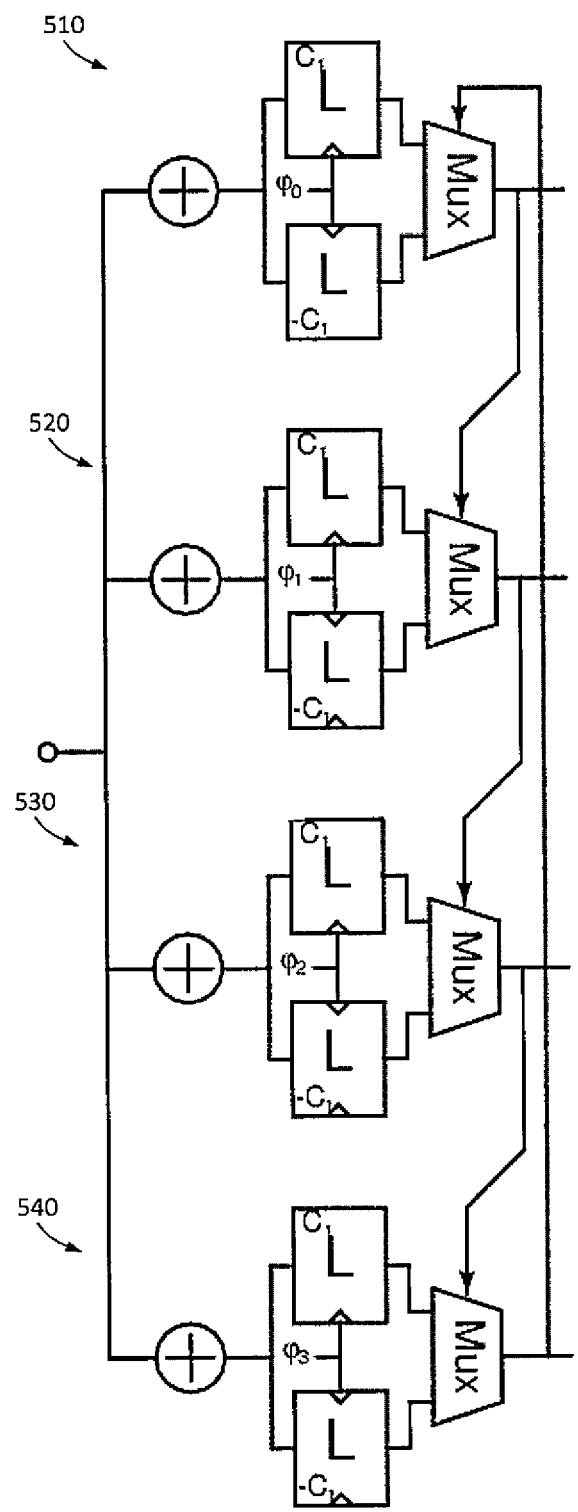
FIG. 5A is a schematic diagram, shown for comparison, of a system for predictive decision feedback equalization.
Figure 5B:
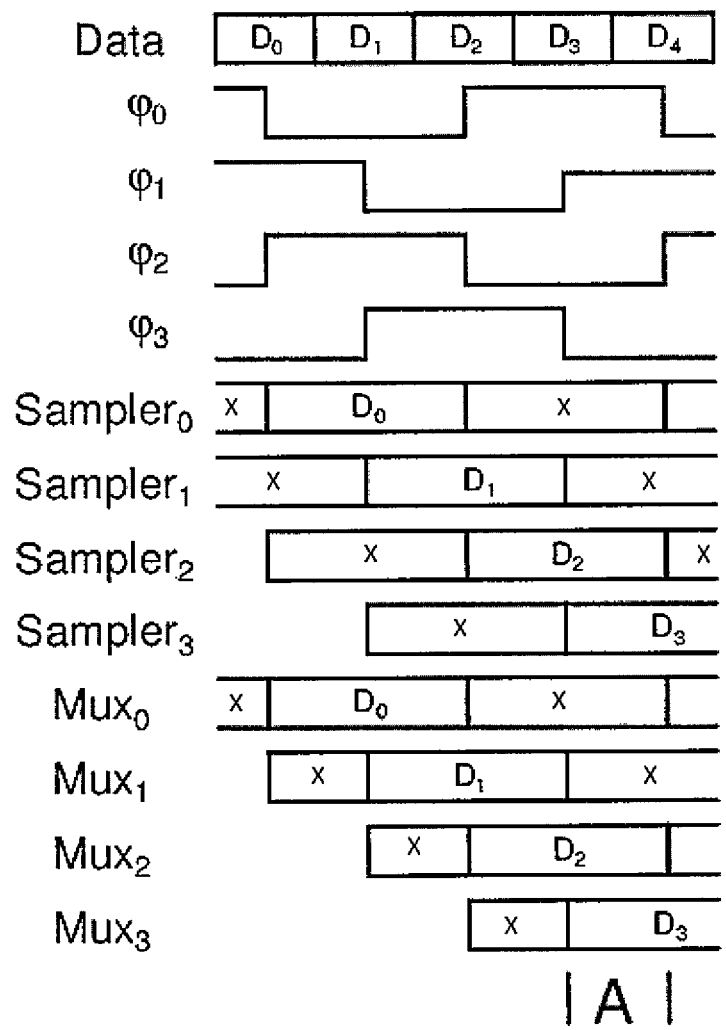
FIG. 5B is a timing diagram illustrating the behavior of the circuit of FIG. 5A.

Referring to FIGS. 5A and 5B, in one embodiment a predictive DFE circuit with four parallel data paths, using four phases $\phi_0$, $\phi_1$, $\phi_2$, and $\phi_3$ is depicted. The four phases are consecutively separated in phase by 90 degrees and this embodiment also may fail to operate reliably if latch-based samplers are used. In this embodiment, each sampler tracks when its clock input is high, and holds when the clock input is low. FIG. 5B is a timing diagram illustrating the behavior of the circuit of FIG. 5A. For example, during the intervals labeled "X", the outputs of the samplers in the first data path, represented in FIG. 5B by the line labeled "Sampler$_0$", vary as the analog input to the data path varies, because the clock phase $\phi_0$ controlling these two samplers is high; during the time interval labeled "D$_0$", the clock phase $\phi_0$ is low and the outputs are held. The output of the multiplexer in the first branch 510 is illustrated in the line labeled "Mux0". The other three data paths operate similarly, according to their respective clock phases.

The following example is described with reference to the interval labeled "A" in the timing diagram of FIG. 5B. During the A interval, the samplers in the fourth data path 540 are holding and in proper operation, the select input of the multiplexer ("Mux") in the first data path 510 would be held constant and would represent the last received bit. The value of the last received bit would cause the multiplexer to select the appropriate branch of the sampler, i.e., the branch in which the offset $C_1$ was added, or the branch in which $C_1$ was subtracted. In the embodiment of FIG. 5A, however, if the analog signal changes so that the inputs of the multiplexer in the first data path 510 change, the value at the select input of the multiplexer in the second data path 520 will change, which may cause the output of the multiplexer in the second data path 520 to change. Similarly a change in the output of the multiplexer in the second data path 520 may cause a change in the output of the multiplexer in the third data path 530, which may cause a change in the output of the fourth data path 540, which is connected to the select input of the multiplexer in the first data path. Thus, the select input of the multiplexer in the first data path, which, as mentioned above, should be constant during the A interval, may vary.

Figure 6A:
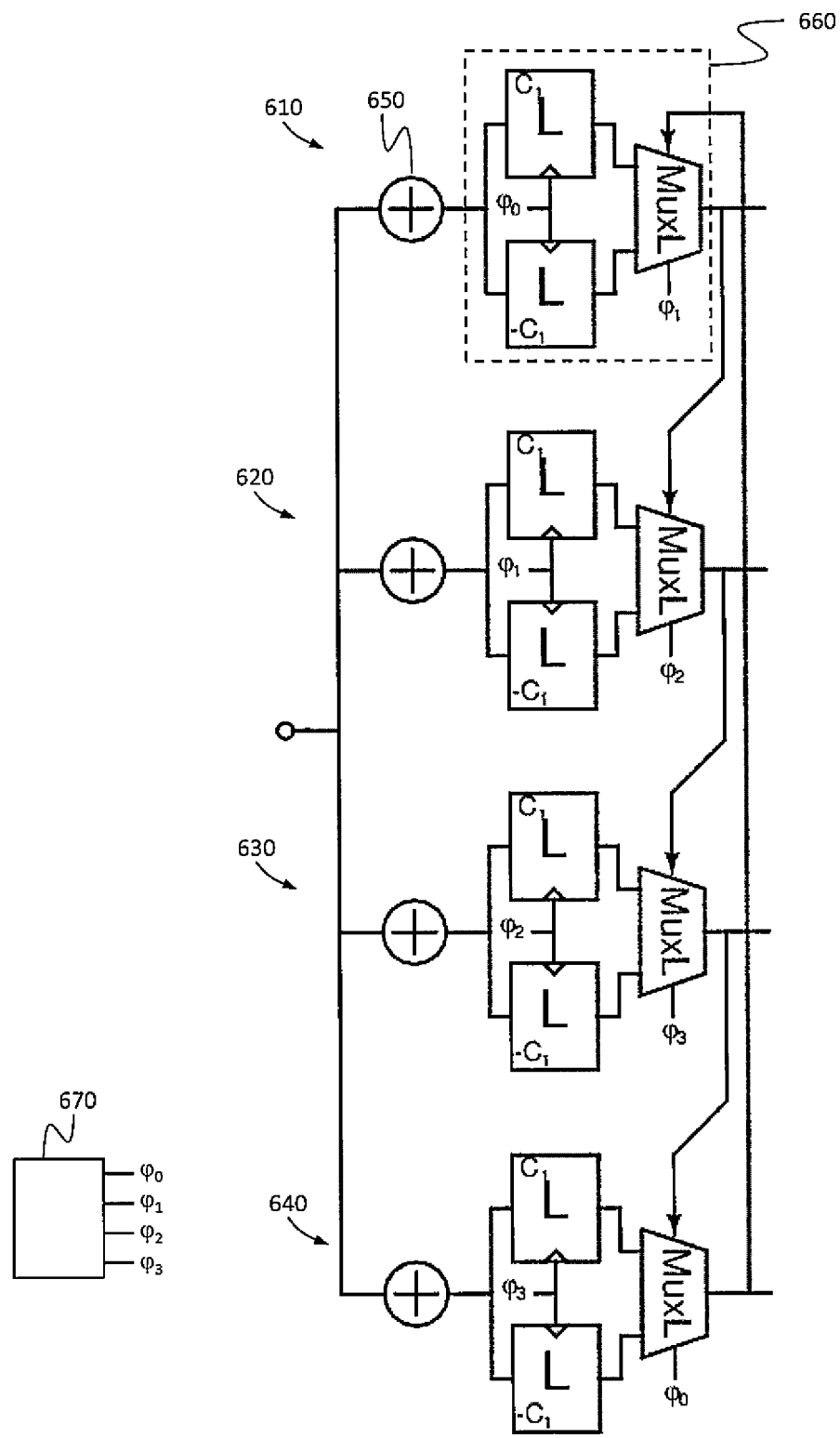
FIG. 6A is a schematic diagram of a system for predictive decision feedback equalization according to an embodiment of the present invention.
Figure 6B:
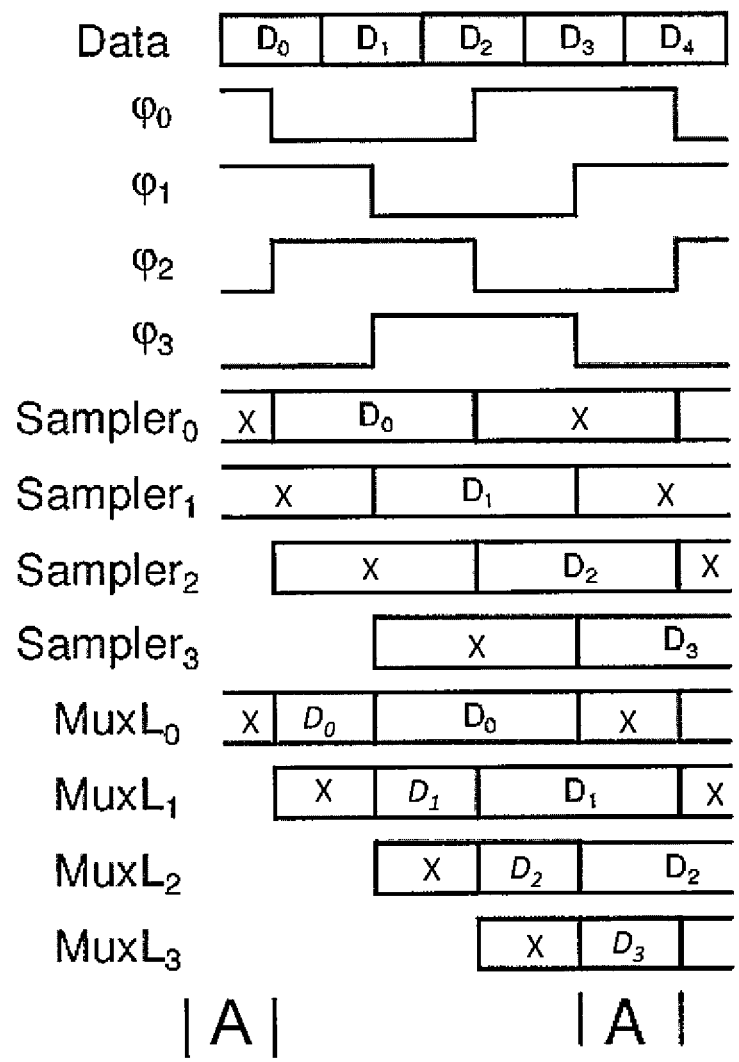
FIG. 6B is a timing diagram illustrating the behavior of the circuit of FIG. 6A.

Referring to FIGS. 6A and 6B, in one embodiment, multiplexer-latches are used in the four data paths 610, 620, 630, 640 instead of logic-only multiplexers. The result is that the select input of the first data path does not change during the A intervals (the intervals labeled "A" in the timing diagram of FIG. 6B). A multiplexer-latch, as used herein, is a circuit element that combines the characteristics of a multiplexer and a latch. A multiplexer-latch has a first data input, a second data input, a select input, a clock input, and an output. When the clock input is a first logic level, the multiplexer-latch is in a tracking state, and the output is the same logic level as the selected input, i.e., the input corresponding to the logic level at the select input. For example, if logical high at the select input corresponds to the first data input being selected, then when the clock input has the first logic level and the select input is logical high, the output is at the same logic level as the first input. When the clock input is the second logic level, the output of the multiplexer-latch holds or "retains" its output state, i.e., it retains the logic level that was present at the output when the clock input transitioned from the first logic level to the second logic level (e.g., when the clock input transitioned from logical high to logical low).

The circuit of FIG. 6A includes, in the first data path 610, an adder 650 and a sampler-multiplexer block 660 consisting of two samplers ("L" in FIG. 6A) and a multiplexer-latch ("MuxL" in FIG. 6A). The adder 650 may be used to subtract residues from earlier-received bits. The two samplers have a common analog input (i.e., their analog inputs are connected together); the common analog input receives a signal from the adder. The two samplers also have a common clock input. The outputs of the two samplers are connected to respective data inputs of the multiplexer-latch. The two samplers have different thresholds corresponding to +C1 and −C1. The second, third, and fourth data paths 620, 630, 640 include the same circuitry as the first data path 610.

A four-phase clock generator 670 may be used to supply the four clock phases $\phi_0$, $\phi_1$, $\phi_2$, and $\phi_3$ from four outputs. Each clock generator output may be connected, for example, to a respective tap in a ring oscillator in the clock generator 670. The ring oscillator may be part of a phase-locked loop or part of a delay-locked loop.

In FIG. 6B, the states of the samplers in the four data paths 610, 620, 630, 640 are represented by four corresponding lines in the timing diagram, labeled Sampler$_0$ through Sampler$_3$. Each sampler is clocked by one of the four clock phases, $\phi_0$, $\phi_1$, $\phi_2$, and $\phi_3$, each of which is delayed by one unit interval (or 90 degrees) relative to a preceding clock phase, as illustrated in the rows labeled $\phi_0$, $\phi_1$, $\phi_2$, and $\phi_3$.

Each sampler is in a tracking state (represented by an X in the timing diagram) when the clock signal at its input is at a first logic level (here logical high), and in a holding state (represented by $D_0$, $D_1$, $D_2$, and $D_3$) when the clock signal at its input is at the second logic level (here, logical low). For example, when $\phi_0$ is at the first logic level, the outputs of the two latches in the first data path 610 track the analog signal, one with a positive offset and one with a negative offset. When the clock transitions from the first logic level to the second logic level, both samplers hold their outputs, and the sampler with the correct (i.e., positive or negative) offset to cancel intersymbol interference from the previous bit has the current bit at its output. The multiplexer-latch in the first data path then selects this sampler (from among the two samplers in the first data path) based on the value of the previous bit that the multiplexer-latch receives, at its select input, from the multiplexer-latch in the fourth data path. The states of the four multiplexer-latches are illustrated in four corresponding rows of the timing diagram, labeled MuxL$_0$ through MuxL$_3$. During the A intervals (i.e., the time intervals labeled "A" in the timing diagram of FIG. 6B), for example, the samplers in the fourth data path 640, and the multiplexer-latch in the third data path 630, all of which receive the fourth clock phase $\phi_3$, are in the holding state; as a result, the data inputs and the select input of the multiplexer-latch in the fourth data path 640 are all unchanging during the A intervals. The output of the multiplexer-latch in the fourth data path 640 thus also does not change during the A intervals, and it supplies the value of the last received bit to the multiplexer-latch in the first data path 610. During the A intervals, the first clock phase $\phi_0$ is at the first logic level and the outputs of the samplers in the first data path 610 may continue to change, as the signal at their common analog input changes. At the end of each A interval, the first clock phase $\phi_0$ transitions to the second logic level, and the two samplers in the first data path 610 sample the analog signal, and each then holds its respective output while the first clock phase $\phi_0$ remains at the second logic level (as indicated for example, for the first A interval, by the label D0 in the Sampler$_0$ row of FIG. 6B). The multiplexer-latch in the first data path 610 is, at the time of the $\phi_0$ transition to the second logic level, in the tracking state, and it selects the output of one or the other of these samplers according to the value of the last received bit (as indicated for the first A interval by the label $D_0$, in italicized text, in FIG. 6B). When the second clock phase $\phi_1$ then transitions to the second logic level, the multiplexer-latch in the first data path 610 transitions to holding, and holds its output value while the second clock phase $\phi_1$ remains at the second logic level, e.g., during the interval labeled $D_0$ in the MuxL$_0$ row of FIG. 6B. The other data paths operate similarly.

Figure 7:
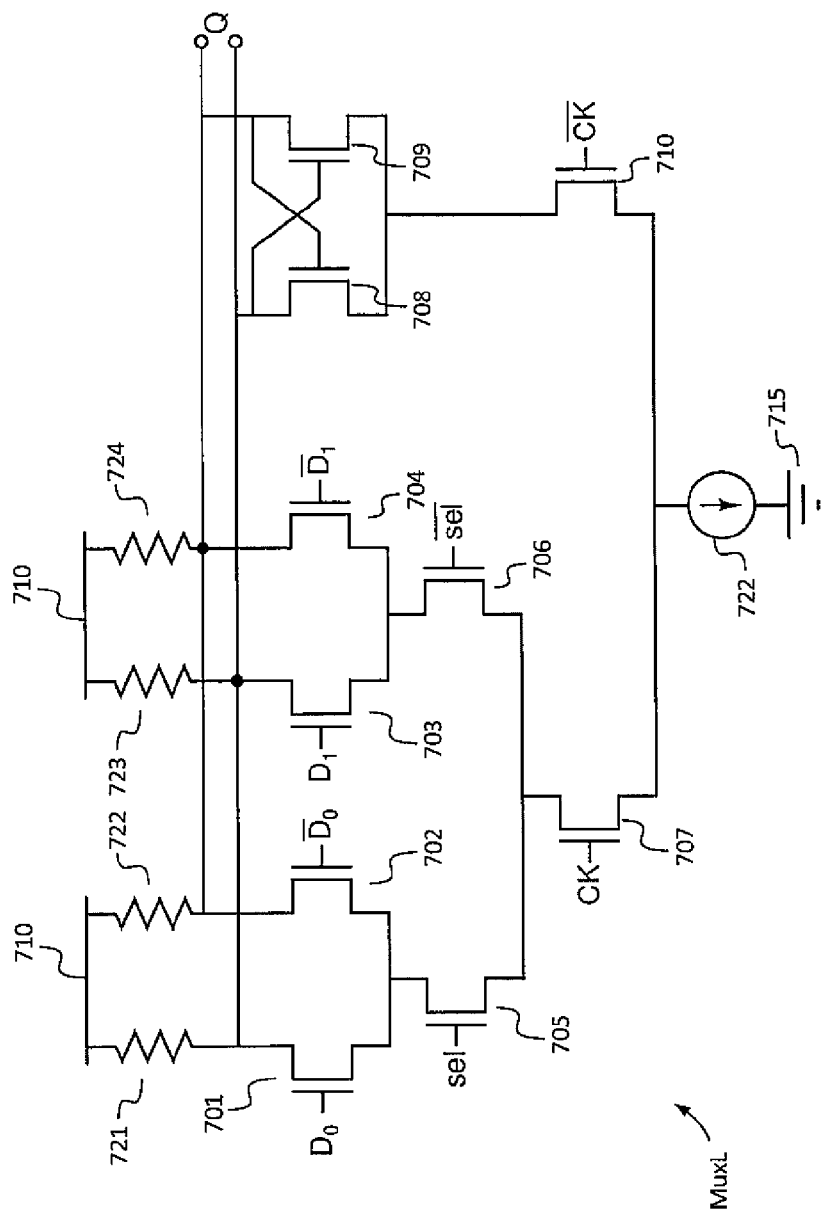
FIG. 7 is a schematic diagram of a multiplexer-latch according to an embodiment of the present invention.

Referring to FIG. 7, in one embodiment a multiplexer-latch is formed using a number of n-channel metal-oxide field effect transistors (n-channel MOSFETs or NMOS transistors). Each NMOS transistor has a first electrode, e.g., a drain (shown as an upper terminal of each transistor in FIG. 7) a second electrode, e.g., a source (shown as a lower terminal of each transistor in FIG. 7) and a control electrode, e.g., a gate (shown as a side terminal of each transistor in FIG. 7). A first differential pair (including a first NMOS transistor 701 and a second NMOS transistor 702) has inputs connected to the first data input $D_0$ of multiplexer-latch and its complement $\overline{D_0}$, and a second differential pair (comprising a third NMOS transistor 703 and a fourth NMOS transistor 704) has inputs connected to the second data input $D_1$ of multiplexer-latch and its complement $\overline{D_1}$. The first differential pair includes output resistors 721 and 722 and the second differential pair includes output resistors 723 and 724; all four of these output resistors are connected to a first power supply line 710.

As used herein, a differential pair is a circuit with two transistors, and two output resistors, the output resistors being connected to a first power supply line and to respective first electrodes of the two transistors, the second electrodes of the two transistors being connected together at a common node, and (indirectly) connected or directly connected to a current source connected to a second power supply line. The control electrodes of the two transistors are the inputs of the differential pair (or, equivalently, form the differential input of the differential pair), and the first electrodes of the transistors are the outputs (or, equivalently, the differential output) of the differential pair.

The outputs of the first and second differential pairs are wired in parallel to respective terminals of the differential output Q of the multiplexer-latch (i.e., the differential outputs of the first and second differential pairs are connected together and to the differential output Q of the multiplexer-latch). The total source current of the first differential pair is controlled by a fifth NMOS transistor 705 connected in series with the common node of the first differential pair, and the total source current of the second differential pair is similarly controlled by a sixth NMOS transistor 706; the fifth and sixth NMOS transistors 705, 706 are controlled by the select input, and by the complement of the select input, respectively, of the multiplexer-latch, so that only one, of the first and second differential pairs, is enabled, i.e., has significant source current, at any time. The sources of the fifth and sixth NMOS transistors 705, 706 are connected together and their total source current (and thus, the total source current of the first and second differential pairs) is controlled by a seventh NMOS transistor 707 connected in series between a current source 722 connected to a second power supply line 715 (which may be ground, as shown) and the sources of the fifth and sixth NMOS transistors 705, 706.

In one embodiment a cross-coupled pair with positive feedback acts as a latch in the multiplexer-latch. This cross-coupled pair is formed as a pair of transistors, an eighth NMOS transistor 708 and a ninth NMOS transistor 709, the differential output of which is connected to the differential outputs of the first and second differential pairs and to the differential output Q of the multiplexer-latch, and the inputs of which are cross-connected to the outputs. The sources of the eighth and ninth NMOS transistors 708, 709 are connected together, and the total source current of the cross-coupled pair is controlled by a tenth NMOS transistor 710, connected in series between the sources of the eighth and ninth NMOS transistors 708, 709 and the current source 722.

In operation, when the clock input is at a first logic level (here logical high) and the multiplexer-latch is tracking, one of the first and second differential pairs is enabled, depending on which of the fifth and sixth NMOS transistors 705, 706 is turned on. The enabled differential pair then transmits the data signal at the corresponding input to the output of the multiplexer-latch. When the clock transitions from the first logic level to the second logic level (here from high to low), the seventh NMOS transistor 707 turns off and the source currents of both the first and second differential pairs are shut off, and these differential pairs cease to affect the output voltage. The cross-coupled pair then becomes enabled, as a result of the tenth NMOS transistor turning on, and latches the output to either the first logic level or the second logic level, depending on the value of the output at the time of the transition in the clock.

Although the exemplary multiplexer-latch circuit of FIG. 7 is constructed using NMOS transistors, the invention is not limited thereto and a complementary circuit performing the same function may be constructed using p-channel metal-oxide field effect transistors (PMOS transistors), as will be understood by one of skill in the art. For example, in a circuit constructed from NMOS transistors, the first power supply line may be supplied with a voltage that is positive with respect to the voltage supplied to the second power supply line (which may be referred to, by convention, as ground). In a circuit constructed with PMOS transistors, the first power supply line may be supplied with a voltage that is negative with respect to the voltage supplied to the second power supply line. In this case the first power supply line may be referred to as ground. In other embodiments, the circuit may be constructed with bipolar junction transistors, e.g., NPN bipolar junction transistors, with the first electrode being the collector of an NPN transistor, the second electrode being the emitter, and the control electrode being the base.

Figure 8:
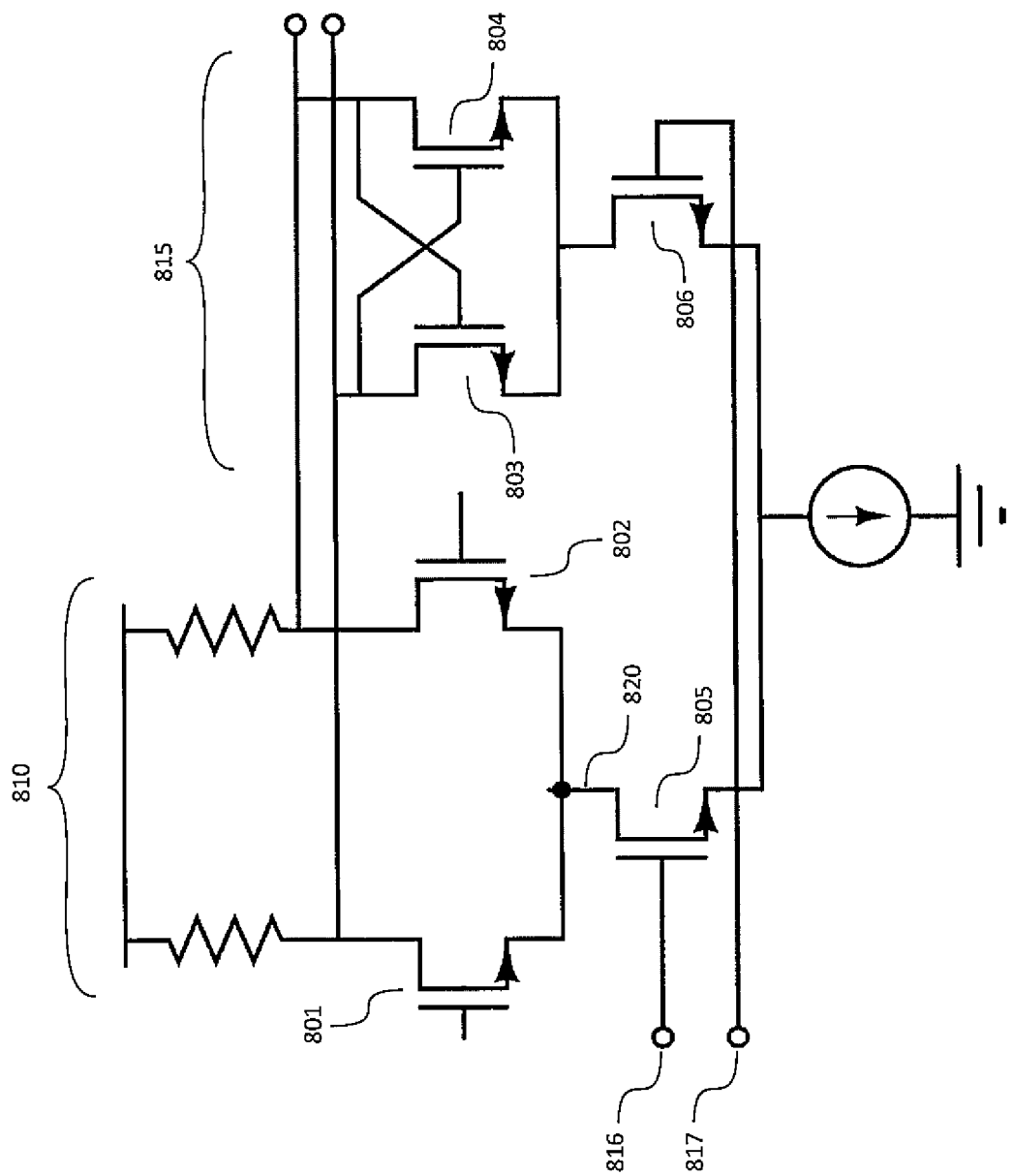
FIG. 8 is a schematic diagram of a sampler according to an embodiment of the present invention.

A sampler may be constructed as illustrated in FIG. 8 from 6 NMOS transistors in a circuit including first and second NMOS transistors 801, 802 forming a differential pair 810 and third and fourth NMOS transistors 803, 804 forming a cross-coupled pair. The sources of the NMOS transistors of the differential pair are connected together at a common node 820, and the total source current of the differential pair is controlled by a fifth NMOS transistor 805, the gate of which is connected to the clock input of the sampler. The sources of the NMOS transistors 803, 804 of the cross-coupled pair are connected together, and the total source current of the cross-coupled pair is controlled by a sixth NMOS transistor 806, the gate of which is connected to the complementary clock input of the sampler. Thus, when the clock input is at a first logic level (here logical high), the differential pair 810 is enabled and the output of the sampler tracks the input; when the clock input is low (and the complementary clock input is high), the cross-coupled pair 815 is enabled and the output of the sampler retains its previous value. As is the case with the multiplexer-latch circuit of FIG. 7, in other embodiments the sampler may be constructed with transistors other than NMOS transistors; PMOS transistors or bipolar junction transistors may be used, for example.

The embodiment of FIG. 6A may be generalized to form a circuit in which the clock rate is lower than one quarter of the data rate, by using more than four parallel data paths, and, as in FIG. 6A, connecting each multiplexer-latch output to the select input of the subsequent multiplexer-latch, with the output of the final multiplexer-latch being connected to the select input of the first multiplexer-latch. A clock generator that generates one clock phase for each data path may be used, with, in each data path, the multiplexer-latch clock input being connected to a clock phase delayed by one unit interval relative to the clock phase at the clock input of the sampler, and with the clock phase at the clock input of the sampler being delayed by one unit interval relative to the clock phase at the clock input of the sampler in the preceding data path.

Figure 9:
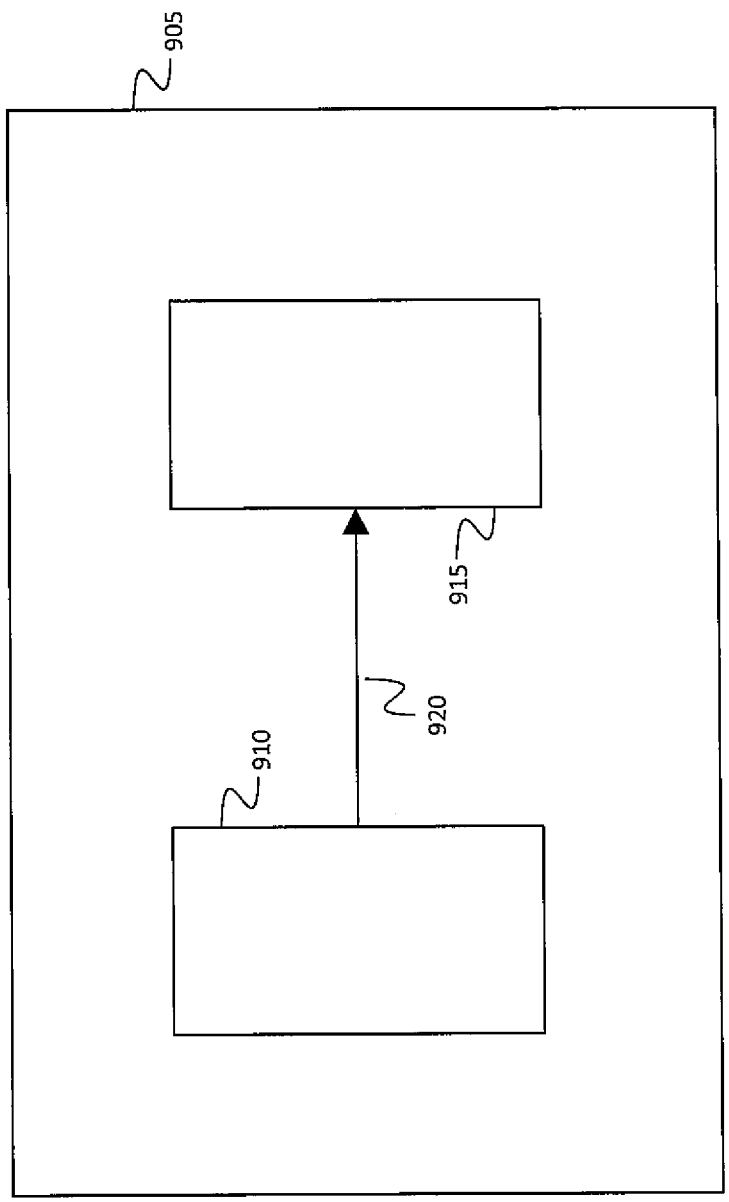
FIG. 9 is a block diagram of a display according to an embodiment of the present invention.

Referring to FIG. 9, in one embodiment, a display 905 contains a timing controller 910 configured to send high-speed digital data to a driver integrated circuit (driver IC) 915, over a non-ideal (e.g., lossy) channel 920. The driver IC receives a signal that is affected by inter-symbol interference. The driver IC includes a predictive DFE constructed according to an embodiment of the present invention to mitigate the effects of the inter-symbol interference. Here, in embodiments of the present invention, the display is an organic light emitting diode (OLED) display or a liquid crystal display (LCD).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of present invention". Also, the term "exemplary" is intended to refer to an example or illustration.

As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a CML quarter-rate predictive feedback equalizer architecture have been specifically described and illustrated herein, many modifications and variations will be apparent to those skilled in the art. Accordingly, it is to be understood that a CML quarter-rate predictive feedback equalizer architecture constructed according to principles of this invention may be embodied other than as specifically described herein. The invention is also defined in the following claims, and equivalents thereof.

What is claimed is:

1. A system for predictive decision feedback equalization, the system comprising:
a first sampler-multiplexer block and a second sampler-multiplexer block, each of the first sampler-multiplexer block and the second sampler-multiplexer block comprising:
a first sampler and a second sampler,
the first sampler and the second sampler having a common analog input and a common clock input, each of the first sampler and the second sampler being to retain its output state when a first clock signal at its clock input is a first logic level; and
a multiplexer-latch connected to an output of the first sampler and to an output of the second sampler, the multiplexer-latch having a clock input, a select input, and an output,
the multiplexer-latch being to retain its output state when a second clock signal at its clock input is a second logic level,
the output of the multiplexer-latch of the first sampler-multiplexer block being connected to the select input of the multiplexer-latch of the second sampler-multiplexer block, and
a clock generator, the clock generator being a phase-locked loop comprising a ring oscillator, the clock generator having:
a first clock output having a first phase, and
a second clock output having a second phase delayed by one unit interval with respect to the first phase,
the first clock output of the clock generator being connected to the common clock input of the first and second samplers of the first sampler-multiplexer block,
wherein the first sampler comprises:
a differential pair comprising a first transistor, a second transistor, a first resistor and a second resistor; and
a cross-coupled pair comprising a third transistor and a fourth transistor
a first terminal of the first resistor being connected to a first power supply line,
a second terminal of the first resistor being connected to a drain of the first transistor, and to the output of the first sampler,
a first terminal of the second resistor being connected to the first power supply line, and
a second terminal of the second resistor being connected to a drain of the second transistor, and to the output of the first sampler,
wherein the multiplexer-latch comprises:
a first differential pair comprising a first transistor, a second transistor, a first resistor and a second resistor; and
a second differential pair comprising a third transistor, a fourth transistor, a third resistor and a fourth resistor;
a differential output of the first differential pair being connected in parallel with a differential output of the second differential pair, and
wherein the multiplexer-latch does not include a capacitor connected from a gate of the first transistor of the first differential pair of the multiplexer-latch to a drain of the second transistor of the first differential pair of the multiplexer-latch.

2. The system of claim 1, wherein:
the first clock output has a duty cycle substantially equal to 50%, and
the second clock output has a duty cycle substantially equal to 50%.

3. The system of claim 1, wherein:
the second clock output of the clock generator is connected to the clock input of the multiplexer-latch of the first sampler-multiplexer block and to the common clock input of the first and second samplers of the second sampler-multiplexer block.

4. The system of claim 3, wherein:
the first clock output has a duty cycle substantially equal to 50%, and
the second clock output has a duty cycle substantially equal to 50%.

5. The system of claim 1, comprising four sampler-multiplexer blocks comprising the first sampler-multiplexer block, the second sampler-multiplexer block, a third sampler-multiplexer block, and a fourth sampler-multiplexer block, each of the third sampler-multiplexer block and the fourth sampler-multiplexer block comprising:
  a first sampler and a second sampler,
    the first sampler and the second sampler having a common analog input and a common clock input,
    each of the first sampler and the second sampler being to retain its output state when a third clock signal at its clock input is the first logic level; and
  a multiplexer-latch connected to an output of the first sampler and to an output of the second sampler,
    the multiplexer-latch having a clock input, a select input, and an output,
    the multiplexer-latch being to retain its output state when a fourth clock signal at its clock input is the second logic level,
  wherein:
    the output of the multiplexer-latch of the second sampler-multiplexer block is connected to the select input of the multiplexer-latch of the third sampler-multiplexer block,
    the output of the multiplexer-latch of the third sampler-multiplexer block is connected to the select input of the multiplexer-latch of the fourth sampler-multiplexer block, and
    the output of the multiplexer-latch of the fourth sampler-multiplexer block is connected to the select input of the multiplexer-latch of the first sampler-multiplexer block.

6. The system of claim 5, wherein the clock generator further has:
  a third clock output having a third phase delayed by one unit interval with respect to the second phase, and
  a fourth clock output having a fourth phase delayed by one unit interval with respect to the third phase,
  wherein:
    the first phase is delayed by one unit interval with respect to the fourth phase,
    the first clock output of the clock generator is further connected to the clock input of the multiplexer-latch of the fourth sampler-multiplexer block,
    the second clock output of the clock generator is connected to the clock input of the multiplexer-latch of the first sampler-multiplexer block and to the common clock input of the first and second samplers of the second sampler-multiplexer block,
    the third clock output of the clock generator is connected to the clock input of the multiplexer-latch of the second sampler-multiplexer block and to the common clock input of the first and second samplers of the third sampler-multiplexer block,
    the fourth clock output of the clock generator is connected to the clock input of the multiplexer-latch of the third sampler-multiplexer block and to the common clock input of the first and second samplers of the fourth sampler-multiplexer block.

7. The system of claim 6, wherein
  the first clock output has a duty cycle substantially equal to 50%,
  the second clock output has a duty cycle substantially equal to 50%,
  the third clock output has a duty cycle substantially equal to 50%, and
  the fourth clock output has a duty cycle substantially equal to 50%.

8. The system of claim 1, wherein the first logic level is the same logic level as the second logic level.

9. The system of claim 8, wherein the first logic level is logical low and the second logic level is logical low.

10. The system of claim 1, further comprising an adder connected to the first sampler-multiplexer block.

11. A display, comprising:
  a timing controller comprising a digital output; and
  a driver integrated circuit (IC) having an IC input and comprising the system of claim 1, connected to the IC input,
  the digital output of the timing controller being connected to the IC input of the driver IC.

12. A system for predictive decision feedback equalization, the system comprising:
  a first sampler-multiplexer block comprising:
    a first sampler and a second sampler,
      the first sampler and the second sampler having a common analog input and a common clock input,
      each of the first sampler and the second sampler being to retain its output state when a first clock signal at its clock input is a first logic level; and
    a multiplexer-latch connected to an output of the first sampler and to an output of the second sampler,
      the multiplexer-latch having a clock input, a select input, and an output,
      the multiplexer-latch being to retain its output state when a second clock signal at its clock input is a second logic level,
  a second sampler-multiplexer block comprising:
    a third sampler and a fourth sampler,
      the third sampler and the fourth sampler having a common analog input and a common clock input,
      each of the third sampler and the fourth sampler being to retain its output state when a third clock signal at its clock input is a first logic level; and
    a multiplexer-latch connected to an output of the third sampler and to an output of the fourth sampler,
      the multiplexer-latch having a clock input, a select input, and an output,
      the multiplexer-latch being to retain its output state when a fourth clock signal at its clock input is a second logic level,
    the output of the multiplexer-latch of the first sampler-multiplexer block being connected to the select input of the multiplexer-latch of the second sampler-multiplexer block; and
  a clock generator, the clock generator being a delay-locked loop comprising a ring oscillator, the clock generator having:
    a first clock output having a first phase and a duty cycle substantially equal to 50%, and
    a second clock output having a second phase delayed by one unit interval with respect to the first phase and a duty cycle substantially equal to 50%,
    the first clock output of the clock generator being connected to the common clock input of the first and second samplers of the first sampler-multiplexer block, and
    the second clock output of the clock generator being connected to the clock input of the multiplexer-latch of the first sampler-multiplexer block and to the common clock input of the third and fourth samplers of the second sampler-multiplexer block,
  wherein the first sampler comprises:
    a differential pair comprising a first transistor, a second transistor, a first resistor and a second resistor; and
    a cross-coupled pair comprising a third transistor and a fourth transistor a first terminal of the first resistor being connected to a first power supply line,
a second terminal of the first resistor being connected to a drain of the first transistor, and to the output of the first sampler,
a first terminal of the second resistor being connected to the first power supply line, and
a second terminal of the second resistor being connected to a drain of the second transistor, and to the output of the first sampler,
wherein the multiplexer-latch comprises:
    a first differential pair comprising a first transistor, a second transistor, a first resistor and a second resistor;
    a second differential pair comprising a third transistor, a fourth transistor, a third resistor and a fourth resistor;
    a differential output of the first differential pair being connected in parallel with a differential output of the second differential pair, and
wherein the multiplexer-latch does not include a capacitor connected from a gate of the first transistor of the first differential pair of the multiplexer-latch to a drain of the second transistor of the first differential pair of the multiplexer-latch.

13. A system for predictive decision feedback equalization, the system comprising:
    a first sampler-multiplexer block and a second sampler-multiplexer block, each of the first sampler-multiplexer block and the second sampler-multiplexer block comprising:
        a first sampler and a second sampler,
            the first sampler and the second sampler having a common analog input and a common clock input,
            each of the first sampler and the second sampler being to retain its output state when a first clock signal at its clock input is a first logic level; and
        a multiplexer-latch connected to an output of the first sampler and to an output of the second sampler,
            the multiplexer-latch having a clock input, a select input, and an output,
            the multiplexer-latch being to retain its output state when a second clock signal at its clock input is a second logic level,
        the output of the multiplexer-latch of the first sampler-multiplexer block being connected to the select input of the multiplexer-latch of the second sampler-multiplexer block, and
    a clock generator, the clock generator being a phase-locked loop comprising a ring oscillator, the clock generator having:
        a first clock output having a first phase, and
        a second clock output having a second phase delayed by one unit interval with respect to the first phase,
    the first clock output of the clock generator being connected to the common clock input of the first and second samplers of the first sampler-multiplexer block,
    wherein the first sampler comprises:
        a differential pair comprising a first transistor, a second transistor, a first resistor and a second resistor; and
        a cross-coupled pair comprising a third transistor and a fourth transistor
    a first terminal of the first resistor being connected to a first power supply line,
    a second terminal of the first resistor being connected to a drain of the first transistor, and to the output of the first sampler,
    a first terminal of the second resistor being connected to the first power supply line, and
    a second terminal of the second resistor being connected to a drain of the second transistor, and to the output of the first sampler,
    wherein the multiplexer-latch consists of:
        a first differential pair comprising a first transistor, a second transistor, a first resistor and a second resistor;
        a second differential pair comprising a third transistor, a fourth transistor, a third resistor and a fourth resistor;
        a fifth transistor connected to a common node of the first differential pair and configured to control a total source current of the first differential pair;
        a sixth transistor connected to a common node of the second differential pair and configured to control a total source current of the second differential pair;
        a seventh transistor connected to a source of the fifth transistor and to a source of the sixth transistor and configured to control a total source current of the fifth transistor and the sixth transistor;
        a cross-coupled pair comprising a eighth transistor and a ninth transistor;
        a tenth transistor connected to a source of the eighth transistor and to a source of the ninth transistor and configured to control a total source current of the eighth transistor and the ninth transistor; and
        a current source, a first terminal of the current source being connected to a source of the seventh transistor and to a source of the tenth transistor,
    a differential output of the cross-coupled pair being connected in parallel with:
        a differential output of the first differential pair, and
        a differential output of the second differential pair.

* * * * *